United States Patent
Tan et al.

(10) Patent No.: US 12,308,642 B2
(45) Date of Patent: May 20, 2025

(54) NON-INVASIVE LOAD IDENTIFICATION METHOD BASED ON FINGERPRINT CHARACTERISTICS OF LOAD POWER

(71) Applicant: Guizhou Power Grid Company Limited, Guiyang (CN)

(72) Inventors: Zhukui Tan, Guiyang (CN); Bin Liu, Guiyang (CN); Qiuyan Zhang, Guiyang (CN); Xia Yan, Guiyang (CN); Chenghui Lin, Guiyang (CN); Canhua Wang, Guiyang (CN); Changbao Xu, Guiyang (CN); Hai Zhou, Guiyang (CN); Peng Zeng, Guiyang (CN); Zhaoting Ren, Guiyang (CN); Saiqiu Tang, Guiyang (CN); Cheng Yang, Guiyang (CN); Xiujing Wang, Guiyang (CN); Yutao Xu, Guiyang (CN); Jiaxiang Ou, Guiyang (CN); Houpeng Hu, Guiyang (CN); Jipu Gao, Guiyang (CN); Yu Wang, Guiyang (CN); Mian Wang, Guiyang (CN)

(73) Assignee: Guizhou Power Grid Company Limited, Guiyang (CN)

( * ) Notice: Subject to any disclaimer, the term of this patent is extended or adjusted under 35 U.S.C. 154(b) by 378 days.

(21) Appl. No.: 17/873,188

(22) Filed: Jul. 26, 2022

(65) Prior Publication Data
US 2022/0368128 A1    Nov. 17, 2022

Related U.S. Application Data

(63) Continuation-in-part of application No. PCT/CN2020/141885, filed on Dec. 31, 2020.

(51) Int. Cl.
*H02J 3/00*    (2006.01)
*H02J 3/16*    (2006.01)

(52) U.S. Cl.
CPC .......... *H02J 3/003* (2020.01); *H02J 3/16* (2013.01)

(58) Field of Classification Search
CPC .......... H02J 3/003; G06N 3/08; G06N 50/06
See application file for complete search history.

(56) References Cited

U.S. PATENT DOCUMENTS

2011/0307200 A1* 12/2011 Hsu ................ G06Q 50/06
                                                                  702/61
2012/0290230 A1* 11/2012 Berges Gonzalez ...............
                                                          G05B 19/0428
                                                                  702/61

(Continued)

FOREIGN PATENT DOCUMENTS

CN   108429254 A     8/2018
CN   108899892 A  * 11/2018  ............ H02J 3/00

(Continued)

OTHER PUBLICATIONS

International Search Report and Written Opinion of the corresponding PCT application No. PCT/CN2020/141885 mailed on Aug. 30, 2021.

*Primary Examiner* — Vincent H Tran
(74) *Attorney, Agent, or Firm* — IDEA Intellectual Limited; Margaret A. Burke; Sam T. Yip

(57) ABSTRACT

A non-intrusive load identification method based on the Power Fingerprint characteristics of the load is provided. The method includes: S1, collecting Power Fingerprint characteristic data of several loads of the same type; S2, after preprocessing Power Fingerprint characteristic data of load, establishing convolution neural network based on attention mechanism to learn load characteristics; S3, using sliding time window algorithm to realize load switching event detection, In order to extract the change of electrical data of user bus before and after the switching event, the (Continued)

non-intrusive load identification problem is converted into the single load identification problem; S4, the load identification is realized, and the extracted electrical information features of single load are identified using the trained model. The provided fingerprint feature recognition model can identify and separate the unique load Power Fingerprint feature information, and realize load identification, to solve the practical problem of non-intrusive load identification in complex scenes.

3 Claims, 2 Drawing Sheets

(56) References Cited

U.S. PATENT DOCUMENTS

| | | | | |
|---|---|---|---|---|
| 2019/0013669 A1* | 1/2019 | Davies | ............... | G01D 4/004 |
| 2021/0089900 A1* | 3/2021 | He | ............ | G06N 3/045 |

FOREIGN PATENT DOCUMENTS

| | | | |
|---|---|---|---|
| CN | 110376457 A | * | 10/2019 |
| CN | 110445126 A | * | 11/2019 |
| CN | 111160798 A | | 5/2020 |
| CN | 111368904 A | | 7/2020 |
| CN | 111382789 A | | 7/2020 |
| CN | 111582357 A | | 8/2020 |
| KR | 20160141032 A | | 12/2016 |

* cited by examiner

NON-INVASIVE LOAD IDENTIFICATION METHOD BASED ON FINGERPRINT CHARACTERISTICS OF LOAD POWER

FIELD OF THE INVENTION

The invention relates to the technical field of non-intrusive load identification, in particular to a non-intrusive load identification method based on load Power Fingerprint characteristics.

BACKGROUND OF THE INVENTION

The definition of Power Fingerprint can be summarized as follows: by monitoring the electrical data of power grid equipment, using artificial intelligence technology and big data technology to mine feature points that can represent certain characteristics of the equipment, and the aggregation of multi-dimensional feature points is the Power Fingerprint characteristics of the equipment. Different from the traditional load characteristics, Power Fingerprint features are only limited to load equipment. The application object of Power Fingerprint features can be extended to the whole field of power equipment. It can not only identify the Power Fingerprint of user side equipment, but also identify some distributed generation and energy storage equipment. Non-intrusive load identification can decompose the components of power load and get the information of each electrical equipment by recording the total load information of user bus, and then obtain the information of energy consumption of electrical equipment and user's electricity consumption law. It has small economic input and high acceptance of users. As a new load identification technology, Power Fingerprint technology can provide accurate load characteristic information, and the combination of the two can well meet the practical requirements of load identification.

SUMMARY OF THE INVENTION

The technical problem to be solved by the invention is: to propose a non-intrusive load identification method based on the fingerprint characteristics of the load, which decomposes and identifies the load characteristics by using the trained convolution neural network based on attention mechanism through the variation of the Power Fingerprint characteristic data generated when the user switches the load, and then realizes the non-intrusive load identification. The invention has high-efficiency load decomposition method and strong adaptability to complex scenes, and is a key technology for practical non-intrusive load identification.

The technical scheme of the invention is as follows:

A non-intrusive load identification method based on fingerprint features of load power includes the following steps:

S1, collecting data, collecting Power Fingerprint characteristic data of several loads of the same type;

S2, training model, after preprocessing Power Fingerprint characteristic data of load, establishing convolution neural network based on attention mechanism to learn load characteristics;

Step S210, obtain the Power Fingerprint characteristic data of the load; Step S220, normalize the data and divide the data into training set and verification set; Step S230, the training set data obtained in step S220 is transformed into input matrix, and the convolution neural network based on attention mechanism is established and trained; Step S240S250, the user bus electrical data is used for identification test. The sliding time window algorithm is used to detect the occurrence of load switching events, and the Power Fingerprint feature data before and after the event is made difference to obtain the change. After the transformation method mentioned in step S230;

S3, load switching event detection, using sliding time window algorithm to realize load switching event detection. In order to extract the change of electrical data of user bus before and after the switching event, the non-intrusive load identification problem is converted into the single load identification problem;

S4, the load identification is realized, and the extracted electrical information features are identified using the trained model.

The beneficial effects of the invention are as follows:

(1) A non-intrusive load identification method based on load Power Fingerprint features has broad application prospects and business scenarios in practice. Based on the Power Fingerprint features, an electric Power Fingerprint information database containing a large number of electrical equipment can be constructed. Combining with the information base, each identification link can generate a corresponding business model.

(2) The invention designs a non-intrusive load identification method based on load Power Fingerprint characteristics, which is the application of Power Fingerprint technology. Based on the Power Fingerprint technology and the invention, industrial and commercial users can easily use comprehensive energy services such as demand response, and power grid enterprises can also monitor all kinds of load information, so as to realize peak shaving and valley filling, reduce power generation cost and achieve win-win situation.

(3) The invention designs a non-intrusive load identification method based on load Power Fingerprint features, which adopts a new deep learning solution and has better performance; convolution neural network does not need to manually select features and train weights, that is, it has good feature classification effect, because the network has the feature of sharing convolution core, so it has no need for high-dimensional data processing Pressure.

DETAILED DESCRIPTION

Figure 1:
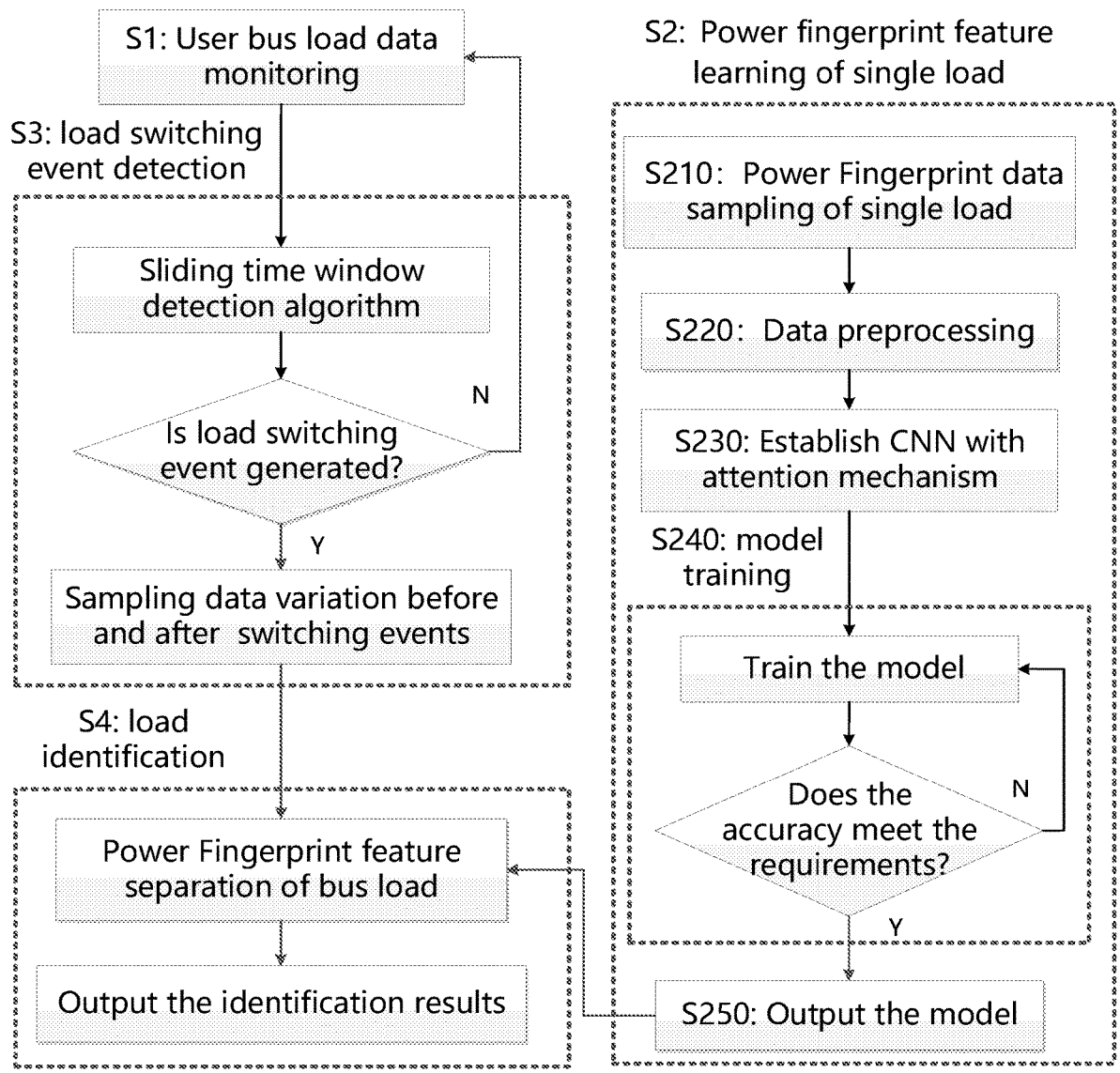
FIG. 1 is the frame diagram of the non-intrusive load identification method based on the load Power Fingerprint feature of the invention.
Figure 2:
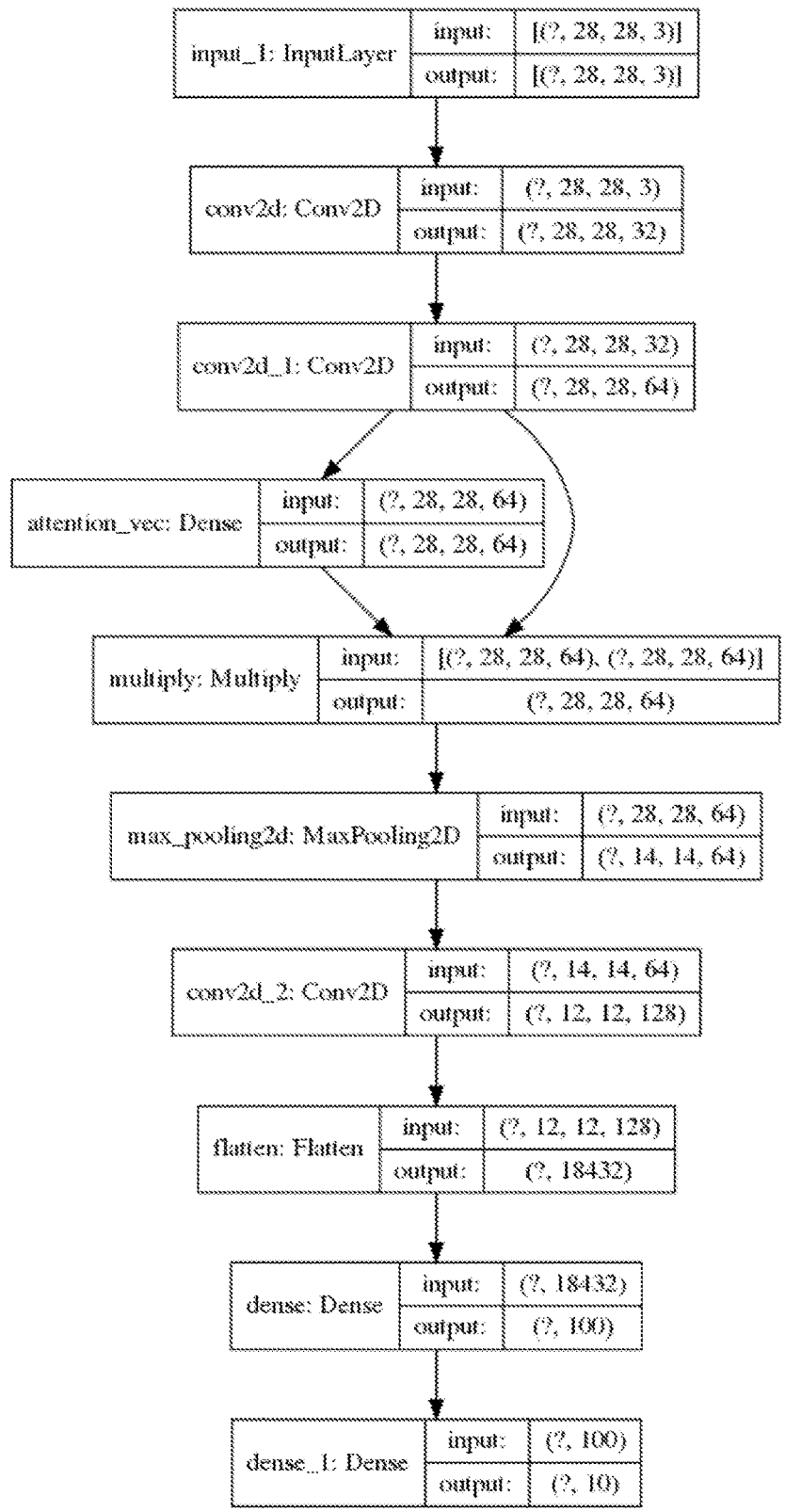
FIG. 2 is a schematic diagram of the convolution neural network model based on attention mechanism of the invention.

Referring to FIG. 1 and FIG. 2, the non-intrusive load identification method based on load Power Fingerprint features of the invention comprises the following steps:

S1, collecting data, collecting Power Fingerprint characteristic data of several loads of the same type;

S2, training model, after preprocessing Power Fingerprint characteristic data of load, establishing convolution neural network based on attention mechanism to learn load characteristics;

Step S210 is used to obtain the Power Fingerprint characteristic data of 10 kinds of loads.

Step S220, normalize the data and divide the data into training set and verification set. Normalization processing formula:

$$a' = \frac{a - a_{min}}{a_{max} - a_{min}}$$

a' represents the normalized result, a represents the feature data, $a_{max}$ represents the maximum value of such feature data, and amen represents the minimum value of such feature data.

Step S230, the training set data obtained in step S220 is transformed into an input matrix of 28*28*3, and a convolution neural network based on attention mechanism is established and trained. In the embodiment, the realization of the attention mechanism is to improve the receptive field of the underlying features through the attention map, and highlight the features more favorable for classification. The network architecture diagram of the convolutional neural network based on attention mechanism in the embodiment is shown in FIG. 2.

Step S240, the verification set is used to judge the accuracy of the model. If the accuracy rate of the model meets the requirements, the training of the model is ended. If not, the super parameters of the network are adjusted.

Step S250, the user bus electrical data is used for identification test. The sliding time window algorithm is used to detect the occurrence of load switching events, and the Power Fingerprint feature data before and after the event is made difference to obtain the change. After the transformation method mentioned in step S230, the change data is transformed into the input matrix of neural network, and the trained model will recognize the load Power Fingerprint feature in the change, and separate it into a group of Power Fingerprint features of a single load Finally, non-intrusive load identification is realized.

S3, load switching event detection, using sliding time window algorithm to realize load switching event detection, in order to extract the change of electrical data of user bus before and after the switching event, the non-intrusive load identification problem is converted into the single load identification problem;

S4, the load identification is realized, and the extracted electrical information features of single load are identified using the trained model.

The above-mentioned embodiments only express several embodiments of the invention, and the description is more specific and detailed, but it can not be understood as a limitation on the scope of the invention patent. It should be pointed out that, for ordinary technical personnel in the art, certain deformations and improvements can be made without departing from the concept of the invention, which belong to the protection scope of the invention. Therefore, the scope of protection of the invention patent shall be subject to the attached claims.

What is claimed is:

1. A non-intrusive load identification method based on load power fingerprint features, comprising following steps:
    step S210, obtaining the power fingerprint characteristic data of the load, wherein the power fingerprint characteristic data comprises: active power, reactive power, apparent power, power factor, voltage amplitude, current amplitude, current 0-11 harmonic content value, and voltage 0-11 harmonic content value;
    step S220, normalizing the data and divide the data into training set and verification set;
    step S230, transforming the training set data obtained in step S220 into input matrix of 28*28*3, establishing and training the convolution neural network based on attention mechanism, wherein the convolutional neural network based on the attention mechanism is trained by using the power fingerprint characteristic data of a single load, wherein the attention mechanism refers to a learning weight distribution, such that different parts for the power fingerprint characteristic data of input data or feature map have different degrees of concentration, wherein the convolution neural network refers to a deep learning model or multilayer perceptron similar to artificial neural network used to analyze visual images;
    step S240, judging the accuracy of the model by using the verification set, wherein if an accuracy rate of the model meets the requirements, the training of the model is ended; else, the super parameters of the convolution neural network are adjusted;
    step S250, using user bus electrical data for identification test, wherein a sliding time window algorithm is used to detect an occurrence of load switching events, and the power fingerprint feature data before and after the event is made difference to obtain the change, wherein, after transformation method mentioned in step S230, change data is transformed into an input matrix of convolution neural network, and the trained model recognizes that the load power fingerprint feature in the change, and separates transformed change data into a group of power fingerprint features of a single load; and realizing the non-intrusive load identification.

2. The non-intrusive load identification method based on load power fingerprint features according to claim 1, further comprising: detecting switching events of user's load switching based on the sliding time window algorithm, so as to decompose the characteristics of each load and obtain an identification result.

3. The non-intrusive load identification method based on load power fingerprint features according to claim 2, wherein the convolutional neural network based on the attention mechanism generates weights in an attention vector (attention_vec) and performs element-wise multiplication (multiply) with a convolutional output to enhance a representation of the power fingerprint characteristic data.

* * * * *